Feb. 17, 1931. C. E. REED 1,792,869
REAMER FOR EARTH BORING APPARATUS
Filed March 21, 1927 2 Sheets-Sheet 1
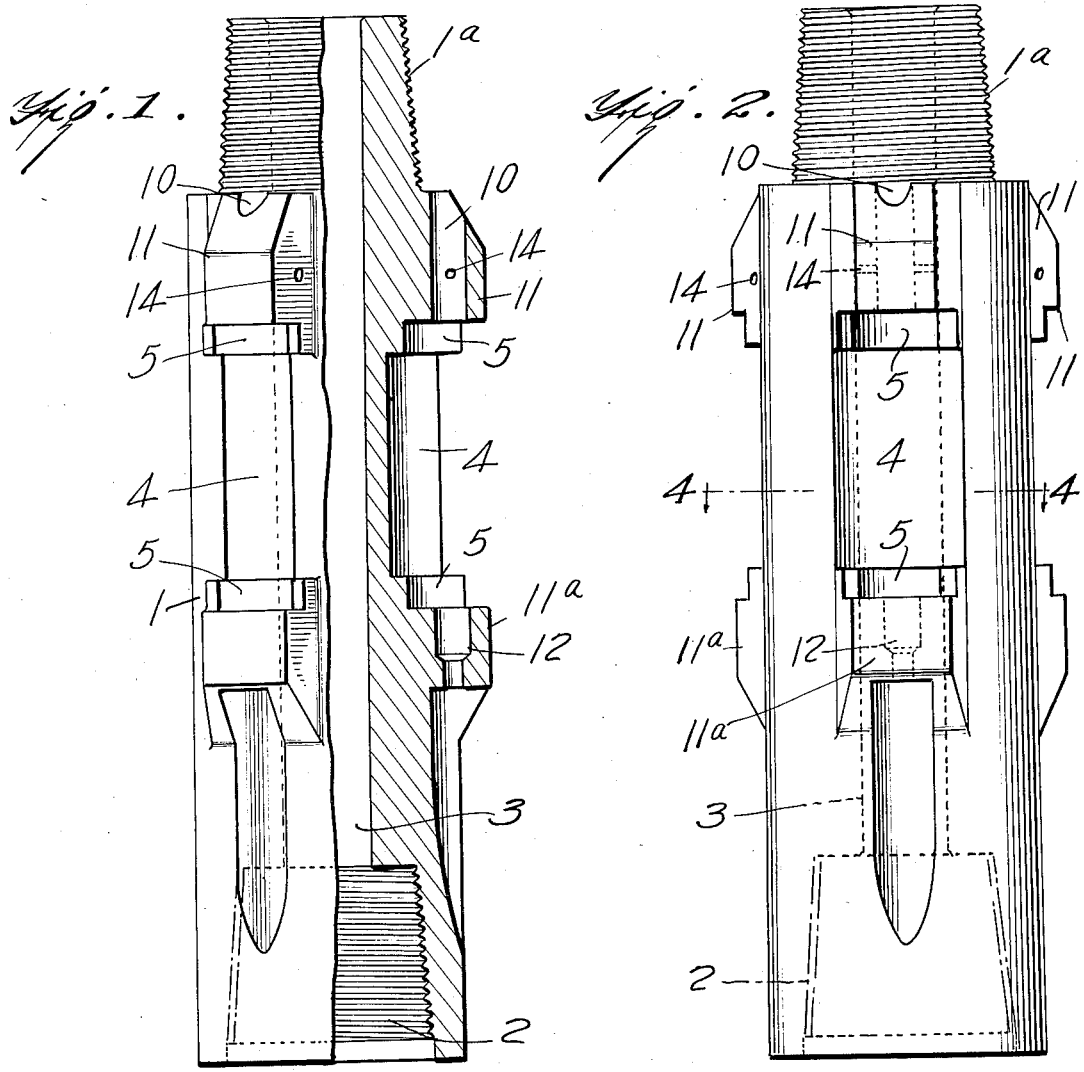
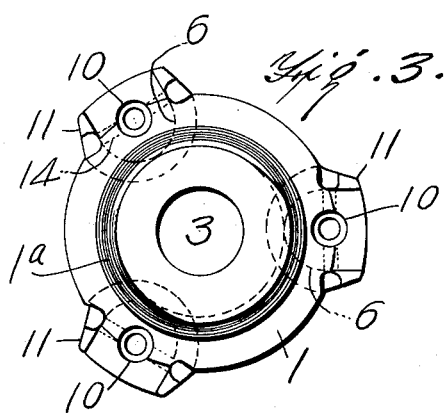
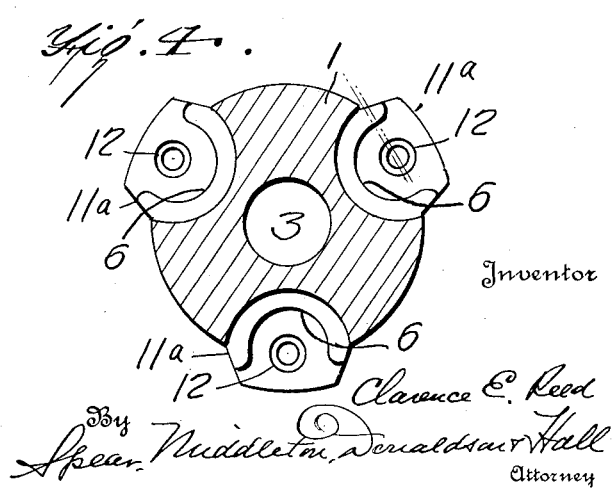
Inventor
Clarence E. Reed
By Spear, Middleton, Donaldson & Hall
Attorney Feb. 17, 1931.  C. E. REED  1,792,869
REAMER FOR EARTH BORING APPARATUS
Filed March 21, 1927  2 Sheets-Sheet 2

Inventor
Clarence E. Reed
By Spear, Middleton, Donaldson & Hall
Attorney

Patented Feb. 17, 1931

1,792,869

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW JERSEY

REAMER FOR EARTH-BORING APPARATUS

Application filed March 21, 1927. Serial No. 176,980.

My invention relates to a reamer unit for use with earth boring apparatus. One object is to provide a reamer organization in which the reamer rollers and bearings are insertible from the outer side of the reamer body or block into recesses in said body, the reamer rollers being journalled outwardly in respect to the side of said body to provide ample space betweeen the body and the wall of the hole for the upflow of the flushing fluid and to provide also a rugged structure of said body by maintaining ample thickness of wall between the recesses and the central bore through which the flushing fluid passes.

Other objects of the invention and novel features of construction will be clear from the following description.

In the accompanying drawings:

Figure 1 is a central vertical section of the reamer block with one of the reamer units in dotted lines.

Fig. 2 is a side view of the reamer block.

Fig. 3 is a plan view.

Fig. 4 is a transverse sectional view on line 4—4 of Fig. 2.

Figure 5:
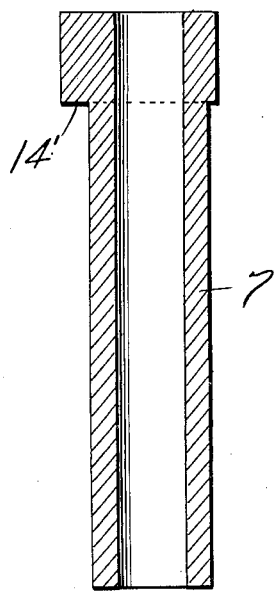
Fig. 5 is a sectional view of the bearing sleeve of the reamer roller cutter.
Figure 8:
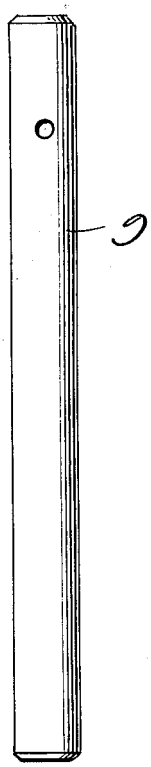
Fig. 8 is a view of a journal pin.
Figure 9:
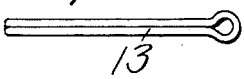
Fig. 9 is a view of a cotter pin.
Figure 10:
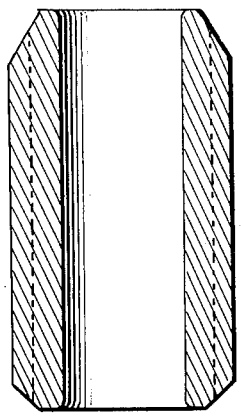
Fig. 10 is a sectional view of the reamer roller cutter and a part of the reamer body in section.
Figure 6:
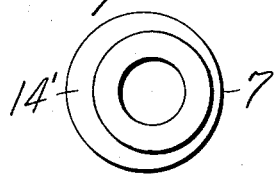
Fig. 6 is a bottom plan view of Fig. 5.
Figure 7:
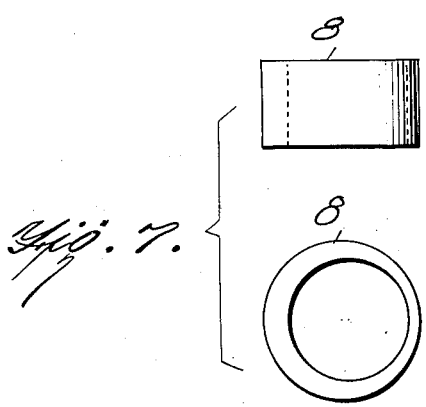
Fig. 7 shows an eccentric collar.
Figure 11:
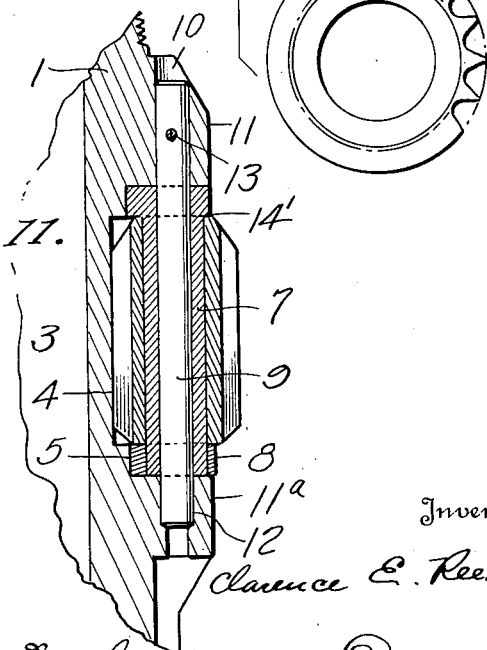
Fig. 11 is a sectional view showing a part of the reamer body and a reamer unit in assembly.

In these drawings 1 is the reamer body having a screw threaded nipple 1a at its upper end and a screw threaded socket 2 at its lower end for attachment to the drill pipe and bit head respectively. It is provided with a central bore 3 for the downflow of the flushing fluid which carries away the cuttings from the bottom of the hole. Recesses 4 are provided in the side of the reamer block to receive the roller reamer cutters.

At the top and bottom of these recesses are auxiliary recesses 5, the wall 6 of each of which is eccentric to the axis of the bearing for the reamer roller cutter. The roller cutter turns on a sleeve 7, the upper end of which has a head eccentric to the axis of said sleeve, with its thicker part directed inwardly from the axis of the roller to bear upon the vertical wall of the body defining the body of the auxiliary recess. The upper head of the sleeve bears in the upper auxiliary recess while the lower end of the sleeve fits in a collar 8 which also is eccentric and bears in the lower auxiliary recess in a manner similar to the relation of the upper eccentric head of the sleeve to the recess in which it is located. The sleeve is held in place by a pin 9 which is passed down through an opening 10 in an upper lug 11 which projects radially from the side of the reamer block, the lower end of said pin being seated in a step bearing socket 12 formed in a lug 11a, which like the lug 11 projects radially from the side of the reamer block. These lugs define upper and lower limits respectively of the upper and lower auxiliary recesses. The pin is held in place by a cotter pin 13 which passes through openings 14 in the upper lug. It will be seen that by reason of mounting the reamer rollers in the projecting lugs, the rollers will be set out away from the axial center of the reamer block, so that they will ream the proper gauge of hole, yet the reamer block will have a considerable space between it and the wall of the hole for the upflow of flushing fluid. By reason of this arrangement also a considerable wall thickness is maintained between the central bore of the block and the recess to make a rugged construction to sustain the lateral thrusts to which the reamer bearings are subjected.

Furthermore the bearing sleeve has the thick portion of its eccentric head in position against the vertical wall at the inner end of the recess so that the inward thrust of the roller will be sustained by this thick part of the head bearing against the wall of the reamer block.

This is true also of the collar at the bottom of the sleeve, which has its thick portion resting against the side wall of the block within the recess. These thicker portions of the head and collar are backed by the wall of the body, which, as above mentioned, is left thick by reason of setting out the reamers and their bearings in relation to the body member.

The bearing sleeve presents a shoulder 14' at the lower side of its eccentric head, and this sustains the upthrust of the reamer roller when the drill is operating in the hole, and this thrust is distributed onto the body of the reamer through the wall defining the upper end of the auxiliary recess.

By reference to the line 6 in Fig. 3 it will be noted that the wall of the auxiliary recess is eccentric to the axis of the cutter, while the wall of the main recess is concentric to said axis.

I claim:

1. In combination with the reamer body having a side recess with auxiliary recesses at the top and bottom ends of the same, a reamer roller bearing sleeve having a head at its upper end, a removable collar on the sleeve at its lower end, said head and collar bearing on the walls of the auxiliary recesses to take the lateral thrust from the reamer roller and a pin passing through the sleeve and supported in the body of the reamer, substantially as described.

2. In combination, a reamer body having a side recess with auxiliary recesses at the upper and lower ends of the same, lugs projecting from the body at said auxiliary recesses, a sleeve member on which a roller cutter in the main side recess is adapted to turn, said sleeve having a head at one end seated in the auxiliary recess and a removable collar at its other end seated in the other auxiliary recess, and a pin passing through the upper lug and through the sleeve into a bearing at the lower lug, substantially as described.

3. In combination with the reamer body having a side recess with auxiliary recesses at the top and bottom ends of the same, a sleeve having a head at its upper end eccentric to its axis and seated in the upper auxiliary recess, said auxiliary recesses being eccentrically shaped, a removable collar on the sleeve at its lower end, said collar being of eccentric shape to fit the correspondingly shaped lower auxiliary recess, said head and collar bearing with their thicker portion on the walls of the auxiliary recesses to take the lateral thrust from the reamer roller, and a pin passing through the sleeve and supported in the body of the reamer.

4. In combination, a reamer body having a side recess with auxiliary recesses at the upper and lower ends of the same, said auxiliary recesses being of eccentric shape, lugs projecting from the body at said auxiliary recesses, a sleeve member on which a roller cutter turns, said sleeve having a head at one end of eccentric shape with respect to the axis of the sleeve, said head being seated in one of said auxiliary recesses and a removable collar on the other end of the sleeve, said collar being of eccentric shape to fit the other auxiliary recess, and a pin passing through the sleeve into a bearing at the lower lug.

5. In combination in a reamer unit for deep well drills, a bearing sleeve having a head at one end eccentric to its axis, a removable collar on the sleeve at its other end, said collar being of eccentric shape with respect to the sleeve axis and a reamer roller cutter mounted on the sleeve between its head and collar.

6. A reamer for deep well drills comprising a block having a main recess in its side, with an auxiliary recess at the top and bottom of the main recess communicating therewith, both the main and auxiliary recesses opening in a direction radially of the block, a rotary cutter, bearing means for said rotary cutter consisting of a sleeve extending through the cutter and having offset means at its upper and lower ends bearing against the walls of the auxiliary recesses, said cutter with its sleeve and offset means being insertable as a unit radially into said block and means on the block to hold the roller cutter unit in place said means engaging the sleeves, substantially as described.

7. A reamer for deep well drills comprising a head having a recess in its side, a reamer cutter, a bearing member rotatably supporting said cutter in said recess and means on the end of said member adjacent said cutter for receiving the thrust of said cutter and engaging a wall of said head intermediate the axes of the cutter and head in a manner to prevent turning movement of said member and to take the lateral thrust of said cutter.

8. A reamer for deep well drills comprising a block having a recess in its side, a cutter assembly insertable as a unit substantially radially of the block into said recess comprising a cutter having a bore, a bearing member extending through said bore and thrust means on said member at one end of said cutter for cooperative engagement with said block intermediate the axes of the cutter and block to hold said member against turning, and means for securing said assembly in place, said thrust means being borne upon by the end of the cutter.

9. A reamer for deep well drills comprising a block having a recess in its side, a cutter assembly insertable as a unit into said recess comprising a cutter having a bore, a one piece bearing member extending through said bore, thrust means on said member at both ends of said cutter extending laterally beyond the periphery of said bearing member and having cooperative non-turning engagement with said block intermediate the axes of the block and cutter and means for securing said assembly in place.

10. In combination, a reamer body having a side recess with an auxiliary recess at one end thereof both opening in a direction radially of the body, a one piece sleeve member in said main recess, a roller cutter mounted for rotation on said member, said sleeve having a head at one end seated in said auxiliary recess and bearing on a wall thereof intermediate the axes of said cutter and head, means including a lug on said body adjacent said auxiliary recess and projecting beyond the side wall of the body for supporting said member, and means on said lug for securing said member in place.

11. A reamer for deep well drills comprising a block having in its side a main recess with a supplemental recess at one end thereof both opening in a direction radially of the head, a reamer cutter in said main recess, a bearing member for said cutter having an offset portion shaped to fit said supplemental recess thereby to hold said member against turning, and means for securing said member to said block.

12. A reamer cutter assembly for insertion as a unit into a recess in a reamer body comprising a roller cutter having a bore therethrough, and a one piece bearing member extending through said bore having a head at one end engaging one end of said cutter for taking the end thrust of the latter said head extending laterally beyond the periphery of said bearing member for interlocking engagement with the reamer body to prevent the member from turning.

13. A reamer cutter assembly for insertion as a unit into a recess in a reamer body comprising a roller cutter having a bore therethrough, a one piece bearing member extending clear through said roller cutter, thrust means on said member in engagement with one end of said cutter and in eccentric relation to the bearing member to cooperate with the reamer body to prevent said bearing member from turning and thrust means on said member at the other end of said cutter engaging the body in such manner as to prevent its turning with the cutter.

14. A cylindrical bearing member for a reamer cutter having a circular head eccentrically disposed to the axis thereof for disposition in a cooperating recess in a reamer body to prevent the member from turning and having also a substantially axial recess for receiving securing means.

15. A bearing and thrust member for a reamer cutter having a head at one end with a part offset from the bearing portion to engage a recess in a reamer body, thereby to hold the bearing member against turning, and a separate thrust washer to be sleeved offset over the end of the member remote from said head.

16. A bearing and thrust member having a head at one end integral therewith and of eccentric shape to serve as a thrust member and to lock the bearing member against turning when mounted in a reamer body, and having a separate thrust washer of identical shape with said bearing head to be sleeved over the end of said bearing member remote from said bearing head and to be disposed in the same radial plane, said bearing member having an axial bore therethrough to receive a securing member.

17. In combination in a reamer for deep wells, a reamer body, a roller unit comprising a bearing member having at one end, adjacent the roller, an eccentric thrust collar sleeved thereon and seated in a recess in the reamer body auxiliary to the roller recess, means supporting the bearing member non-rotatably in the reamer body, and a roller cutter.

18. In a combination with the reamer body having a side recess with an auxiliary recess at each end of the same, a reamer roller, a reamer roller bearing member, an eccentric thrust member at each end of the roller extending laterally beyond the periphery of the bearing and located between the end of the roller and the wall of the auxiliary recess, said thrust members bearing on the lateral walls of the auxiliary recesses to take the lateral thrust from the reamer roller and also contacting with and receiving the end thrust from said roller cutter, and means retaining the bearing member in the body of the reamer.

19. In a reamer body for deep wells, a side recess to receive a roller, an auxiliary recess communicating with the side recess, said auxiliary recess to receive bearing means adjacent the one of the reamer roller, and an outer recess beyond the auxiliary recess, said outer recess being concentric with the side recess to house the means locking the roller unit assembly to the reamer body, said auxiliary recess presenting a thrust sustaining wall intermediate the axis of the outer recess and the axial center of the reamer body and means on the body to receive the bearing means at the other end of the reamer roller.

20. In a body for deep well apparatus, a roller, a bearing member on which the roller turns, an eccentric thrust member at each end of the roller, said eccentric thrust members being seated in recesses in the body auxiliary to the roller recess and the bearing member retained in the body by means housed in the body adjacent the auxiliary recesses.

21. In combination in a reamer body having a laterally open main recess and auxiliary recesses also laterally open and of radially smaller extent than the main recess and communicating therewith, a roller cutter adapted in diameter to occupy the main recess, thrust members in the auxiliary recesses, and means coaxially arranged with the roller cutter and supported in the reamer body and passing through said thrust members, said members bearing on the inner walls of the auxiliary recesses located intermediate the axis of the roller cutter and the axis of the reamer body and thereby taking the inward radial thrust of the roller cutter, said thrust members also contacting the ends of the roller and taking the axial thrust therefrom, substantially as described.

22. A reamer for deep well drills comprising a block having means for attachment to a drill organization and having a main recess in its side opening in a direction radially of the block, a reamer roller organization comprising a reamer roller adapted to lie in said radially open recess and having means in one piece extending through the axial bore of the roller with its ends extending beyond the same with thrust bearing means offset inwardly toward the axis of the block, said block having auxiliary recesses smaller than the main recess and presenting bearing walls intermediate the roller axis and the axis of the block, with which walls the offset thrust bearing means contact, and means for holding the bearing in place, said thrust bearing means lying between the ends of the roller cutter and the overlying and underlying walls of the upper and lower auxiliary recesses respectively and taking the end thrust of the roller cutter, substantially as described.

23. A reamer for deep well drills comprising a block having a central bore for the passage of flushing fluid, said block having laterally open main recesses in its side separated by a wall portion from the central bore, and auxiliary recesses at top and bottom of the main recess also laterally open and communicating with the main recess, said auxiliary recesses being shallower than the main recess and having wall portions separating them from the central bore thicker than the separating wall of the main recess, and a roller cutter unit insertible laterally as one body into the main and auxiliary recesses, said unit comprising a roller cutter, a bearing member recessed axially and extending in one piece through the bore of the roller cutter and beyond the same at both ends with thrust sustaining means at said extended ends of the bearing member contacting the said thick separating walls of the auxiliary recesses, and means supported in the reamer body and engaging the recess of the bearing member to hold the unit in place, substantially as described.

In testimony whereof, I affix my signature.

CLARENCE E. REED.